US012664887B2

(12) United States Patent
Eldessouki

(10) Patent No.: US 12,664,887 B2
(45) **Date of Patent: *Jun. 23, 2026**

(54) METHOD FOR ASSESSING SHOCK WAVE PATTERNS AT A TRAFFIC INTERSECTION

(71) Applicant: Imam Abdulrahman Bin Faisal University, Dammam (SA)

(72) Inventor: Wael Mohamad ElSayed Eldessouki, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 125 days.

This patent is subject to a terminal disclaimer.

(21) Appl. No.: 18/883,356

(22) Filed: Sep. 12, 2024

(65) Prior Publication Data

US 2025/0006048 A1 Jan. 2, 2025

Related U.S. Application Data

(63) Continuation of application No. 18/512,604, filed on Nov. 17, 2023, now Pat. No. 12,125,380, which is a (Continued)

(51) Int. Cl.
*G08G 1/01* (2006.01)
*G08G 1/017* (2006.01)

(52) U.S. Cl.
CPC ........... *G08G 1/0145* (2013.01); *G08G 1/012* (2013.01); *G08G 1/0133* (2013.01); *G08G 1/017* (2013.01)

(58) Field of Classification Search
None
See application file for complete search history.

(56) References Cited

U.S. PATENT DOCUMENTS 4,229,726 A * 10/1980 Deaton .................. G08G 1/015 377/9
2005/0105773 A1 5/2005 Saito et al.
(Continued)

FOREIGN PATENT DOCUMENTS

CN 106355907 A 1/2017
CN 111183464 A * 5/2020 ............... G08G 1/08
(Continued)

OTHER PUBLICATIONS

"A New Approach for Modeling Vehicle Delay at Isolated Signalized Intersections" by Yetis Sazi Murat, Ph. D., Nov. 2007, available at https://nacto.org/wp-content/uploads/2015/04/A-New-Approach-for-Modeling-Vehicle-Delay-at-Isolated-Signalized-Intersections.pdf (Year: 2007).*
(Continued)

*Primary Examiner* — Adam D Tissot
*Assistant Examiner* — Charles Pall
(74) *Attorney, Agent, or Firm* — Oblon, McClelland, Maier & Neustadt, L.L.P.

(57) ABSTRACT

A method and apparatus for level of service assessment at signalized intersections is disclosed. In an exemplary embodiment, a method for estimating an average delay per vehicle at a signalized intersection with a traffic signal, including sampling vehicle arrival rates at the signalized intersection, sampling vehicle departure rates at the signalized intersection, analyzing generated shock waves at the traffic signal, wherein the traffic signal shock wave is a change in vehicle density due to changes in the traffic signal, and estimating the average delay per vehicle based on the vehicle arrival rates, the vehicle departure rates, and the traffic shock waves at the signalized intersection.

12 Claims, 9 Drawing Sheets

Related U.S. Application Data continuation of application No. 18/337,124, filed on Jun. 19, 2023, now Pat. No. 11,854,388, which is a continuation of application No. 17/411,463, filed on Aug. 25, 2021, now Pat. No. 11,741,830.

(56) References Cited

U.S. PATENT DOCUMENTS

| | | | | |
|---|---|---|---|---|
| 2009/0174573 | A1 | 7/2009 | Smith | |
| 2010/0079306 | A1 * | 4/2010 | Liu | G08G 1/082 340/909 |
| 2017/0124863 | A1 | 5/2017 | Dumazert et al. | |
| 2017/0213453 | A1 * | 7/2017 | Cornthwaite | G06F 3/0346 |
| 2018/0174447 | A1 * | 6/2018 | Pellolio | G08G 1/052 |
| 2020/0035096 | A1 * | 1/2020 | Sun | G08G 1/095 |
| 2020/0175860 | A1 * | 6/2020 | Jiang | G08G 1/0129 |
| 2020/0184810 | A1 * | 6/2020 | Sun | G08G 1/0129 |
| 2023/0222897 | A1 * | 7/2023 | Bai | G08G 1/0141 340/933 |

FOREIGN PATENT DOCUMENTS

| | | | | |
|---|---|---|---|---|
| EP | 3619697 | B1 * | 5/2024 | G08G 1/082 |
| KR | 10-2018-0043426 | A | 4/2018 | |

OTHER PUBLICATIONS

Wang et al., "Traffic parameters estimation for signalized intersections based on combined shockwave analysis and Bayesian Network", Trans. Res. Part C: Emerging Technologies, vol. 104, 2019, pp. 22-37, ISSN 0968-090X, available at https://www.sciencedirect.com/science/article/pii/S0968090X18314013 (Year: 2019).*

Machine translation of CN 111183464 A (Year: 2026).*

Wei Zhang, et al., "Traffic Congestion Evaluation and Signal Control Optimization Based on Wireless Sensor Networks: Model and Algorithms", Hindawi Publishing Corporation, Mathematical Problems in Engineering, Article ID: 573171, Dec. 2012, 17 pages.

A. A. Kazemi, et al., "Estimation of Level of Service at Signalized Intersections around the Proposed Health Campus in Etlik, Ankara", 11th International Congress on Advances in Civil Engineering (ACE), Oct. 21-25, 2014, 6 pages.

P.S. Bokare, et al., "Acceleration-Deceleration Behaviour of Various Vehicle Types", Transportation Research Procedia, World Conference on Transport Research—WCTR, vol. 25, 2017, pp. 4733-4749.

* cited by examiner

METHOD FOR ASSESSING SHOCK WAVE PATTERNS AT A TRAFFIC INTERSECTION

CROSS-REFERENCE TO RELATED APPLICATIONS

The present application is a continuation of U.S. application Ser. No. 18/512,604, now allowed, having a filing date of Nov. 17, 2023, which is a continuation of U.S. application Ser. No. 18/337,124, now U.S. Pat. No. 11,854,388, having a filing date of Jun. 19, 2023 which is a continuation of U.S. application Ser. No. 17/411,463, now U.S. Pat. No. 11,741,830, having a filing date of Aug. 25, 2021.

TECHNICAL FIELD

The present disclosure is directed to a method, system, and apparatus for estimating delay at signalized intersections based on sampling vehicle arrival rates and departure rates to estimate an average control delay per vehicle. Disclosed method, system, and apparatus estimates the average control delay per vehicle to assess the level of service (LOS) at signalized intersections. The present disclosure is directed to a service logging device for assessing the LOS at the signalized intersection.

BACKGROUND

The “background” description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

On a freeway, a traffic shock wave, also referred to as traffic shockwave, can be defined as boundary •conditions in the time-space domain that demark a discontinuity in flow-density conditions. For example it can be identified as a transition from a flowing, speedy state to a congested, standstill state. However, traffic shock waves are also present in the opposite case, where vehicles that are idle in traffic suddenly are able to accelerate. Traffic shock waves are generally caused by a change in capacity on the roadways (a 4 lane road drops to 3), an incident, a traffic signal on an arterial, or a merge on freeway.

Traffic Signal Shock Waves—At a signalized intersection, a group of shock waves are usually generated due to the changes in the state of the traffic flow accompanying the changes of traffic signal’s indications. Typically two main types of shock waves are usually generated at undersaturated intersections due to the changes in traffic signal indication. The first wave is generated when the signal turns red and is known as a backward queue forming shock wave. The second wave is generated when the signal turns green and is known as a backward recovery shock wave.

Typically, the Highway Capacity Manual (HCM) TRB2010 defines a technique for measuring delay at a signalized intersections in the field. The HCM technique requires a team of at least two observers, where a first observer counts a number of vehicles in a queue every specific interval at a traffic signal and tally the count for each cycle. The first observer is required to continue counting even after the traffic signal turns green and only stops after a last vehicle stopped in a given cycle passes a signal line in the traffic signal. Also, the HCM technique requires that the intersection should be undersaturated, i.e., the demand volume should not be greater than the capacity. A second observer’s task is to count passing vehicles and keep track of how many vehicles have stopped. The team performs the aforementioned counting process for at least 5 cycles, thereafter performs the following calculations:

1. Sum each column of vehicle-in-queue counts, then sum the column totals for the entire survey period.
2. Estimate average time-in-queue per vehicle arriving the survey period is estimated using the following:

Time-in-queue per vehicle, $$dvq = \left(l_s * \frac{\Sigma V_{iq}}{V_{tot}}\right) * 0.9$$

$l_s$=interval between vehicle-in-queue counts (s), $\Sigma V_{iq}$=sum of vehicle-in-queue counts (veh), $V_{tot}$=total number of vehicles arriving during the survey period (veh), and 0.9=empirical adjustment factor.

3. Calculate the average number of vehicles stopped per lane per cycle:

$$\text{Number of vehicles stopping per lane each cycle} = \frac{V_{stop}}{N_C * N}$$

$V_{stop}$=number of stopped vehicles, $N_C$=number of cycles, N=number of lanes.

4. Calculate a fraction of the stopped vehicles, $$FVS = \frac{V_{stop}}{V_T}$$

5. Then, estimate the Acceleration/Deceleration correction delay:

CF is a correction factor that can be obtained from an EXHIBIT A16-2 of the HCM using the number of vehicles stopped per cycle calculated in Step 3

6. The Average Total Control Delay per vehicle (Sec/Veh) is given by:

Control delay/vehicle, $d=d_{vq}+d_{ad}$

TABLE 1

| Acceleration-Deceleration delay correction factor, CF(s) | | | |
|---|---|---|---|
| Free-Flow Speed | ≤7 Vehicles | 8-19 Vehicles | 20-30 Vehicles |
| ≤60 km/hr | +5 | +2 | −1 |
| >60-71 km/hr | +7 | +4 | +2 |
| >71 km/hr | +9 | +7 | +5 |

Vehicle-in-queue counts in excess of about 30 vehicles per lane may not be reliable.

The results of the HCM technique are prone to inaccuracies and have some empirical factors.

U.S. Patent Application No. 2005/0105773 describes image processing techniques for delay estimation at signalize intersections. The image processing techniques require a high mounting point for a camera to increase the field of view to capture the full length of the queue. Although the method may exhibit higher fidelity than HCM, yet it is impractical for easy deployment.

Hence, there is a need for an accurate method to estimate the average control delay per vehicle at signalized intersections that minimizes errors in measurements and can be carried out by a single observer.

SUMMARY

In an exemplary embodiment, a method for estimating an average delay per vehicle at a signalized intersection having a traffic signal, including sampling, by a controller, vehicle arrival rates at the signalized intersection, sampling, by the controller, vehicle departure rates at the signalized intersection, analyzing, by the controller, traffic shock waves that occur at the signalized intersection, wherein the traffic signal shock wave is a change in vehicle density due to changes in the traffic signal, and estimating, by the controller, the average delay per vehicle based on the vehicle arrival rates, the vehicle departure rates, and the traffic signal shock waves at the signalized intersection.

In an exemplary embodiment, a level of service data logging device at a signalized intersection having a traffic signal includes a microcontroller, a memory, a display device, a start button, and at least one data entry button. The microcontroller is configured to receive an input from the start button to start a level of service measurement and open a data storage file in the memory, receive an input from the at least one data entry button when a first vehicle stops after the traffic signal turns red, receive an input from the at least one data entry button when a second vehicle arrives and record an arrival headway as a difference between an arrival time of the second vehicle and an arrival time of the first vehicle, continuously update a mean and a standard deviation of the arrival headway, calculate a standard error of the arrival headway mean, continue to receive the input for additional vehicles' arrival headways and update the mean and standard deviation of the arrival headway until a number of vehicles stopped at the signalized intersection reaches a predetermined queue number or the traffic signal turns green, when the traffic signal turns green the stopped vehicles in the queue start moving, receive an input when the first vehicle discharging from the queue passes the traffic signal, receive an input when a following vehicle passes the traffic signal and record the discharge headway during the departure as a difference between a passing time of the discharging vehicle and a passing time of a previous discharging vehicle during the departure, update a mean and a standard deviation of the discharge headway during the departure, calculate a standard error of the discharge headway mean during the departure, continue to receive the input for additional vehicles and update the mean and standard deviation of the discharge headway during the departure until a data collection stopping criteria is reached, when the data collection stopping criteria is reached, determine an average delay per vehicle, and display the determined average delay per vehicle on the display device.

In an exemplary embodiment, a level of service data logging device at a signalized intersection having a traffic signal, the data logging device comprising a display device, microcontroller and a computer-readable storage medium storing a control program, which when executed causes the microcontroller to perform steps including: receiving an input from a start button to start a level of service measurement and open a data storage file in a memory, receiving an input from at least one data entry button when a first vehicle stops after a the traffic signal turns red, receiving an input from the at least one data entry button when a second vehicle arrives and record an arrival headway as a difference between an arrival time of the second vehicle and an arrival time of the first vehicle, continuously updating a mean and a standard deviation of the arrival headway, calculating a standard error of the arrival headway mean, continuing to receive the input for additional vehicles' arrival headways and update the mean and standard deviation of the arrival headway until the number of vehicles stopped at the signalized intersection reaches a predetermined queue number or the traffic signal turns green, when the traffic signal turns green the stopped vehicles in the queue start moving, receiving an input when the first vehicle discharging from the queue passes the traffic signal, receiving an input when a following vehicle passes the traffic signal and record the discharge headway during the departure as a difference between a passing time of the discharging vehicle and a passing time of a previous discharging vehicle during the departure, updating a mean and a standard deviation of the discharge headway during the departure, calculating a standard error of the discharge headway mean during the departure, continuing to receive the input for additional vehicles and update the mean and standard deviation of the discharge headway during the departure until a data collection stopping criteria is reached, when the data collection stopping criteria is reached, determining an average delay per vehicle, and displaying the determined average delay per vehicle on the display device.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
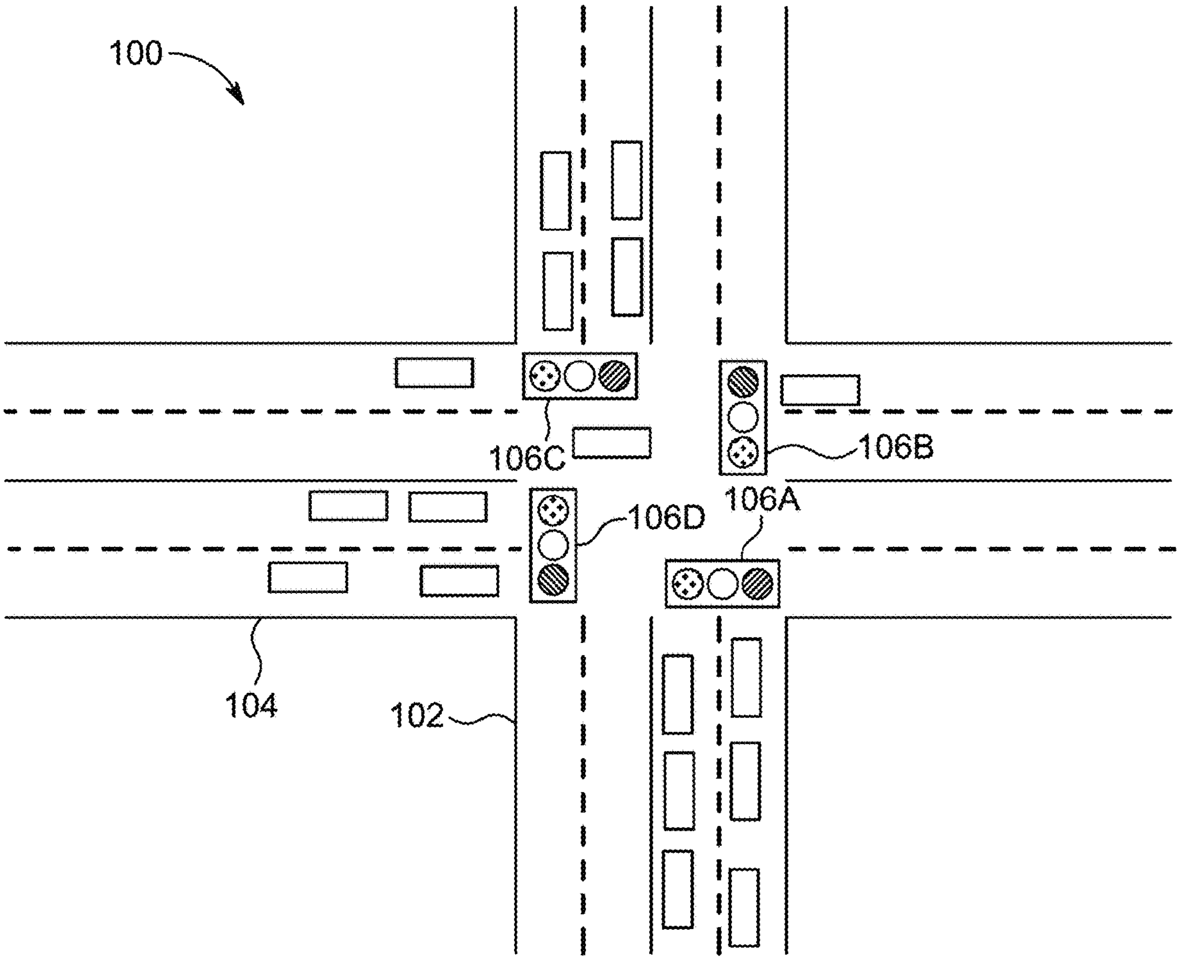
FIG. 1A is an example top view of a signalized intersection with a traffic signal, according to aspects of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a level of service (LOS) logging device for assessing the LOS at a signalized intersection by a single person.

FIG. 1A is an example top view of a signalized intersection 100 with a traffic signal, according to aspects of the present disclosure. FIG. 1A illustrates an example signalized intersection 100 in which two roadways 102 and 104 intersect. Although the example illustrates the intersection 100 having four different directions from which traffic can approach the signalized intersection 100, there can be less than four directions (e.g., three directions in the case of T-intersections) or more than four directions (e.g., five directions, six directions, and the like).

One or more vehicles can approach the signalized intersection 100 at any given time. To control the right of way (ROW) for traffic passing through the intersection 100 from the various approach directions, traffic signals 106A-D are used to indicate the ROW status for vehicles entering from each approach. Each traffic signal can include one or more signal lights oriented toward one or more of the approach directions. The one or more traffic signals 106A-D may be controlled by a traffic signal controller (not shown) so that traffic can flow through the signalized intersection 100 in an orderly and a nonconflicting manner. In some examples, the one or more traffic signals 106A-D may be controlled manually as well where the current invention will not be applicable. Traffic signal controller may cycle the traffic signals 106A-D through the various phases of traffic at the signalized intersection 100. As known, each phase of a traffic signal includes at least three signal indications (e.g., red, yellow, and green) corresponding to each approach toward which the traffic signal is oriented. In a first signal indication, the traffic signal controller turns a traffic signal (e.g., for the sake of explanation the traffic signal 106A) to red. The red signal indicates to drivers of the corresponding approach to stop behind a stop line. After the red signal light has been illuminated for a period of time, the traffic signal 106A changes to a second signal indication in which the traffic signal 106A controller causes a green signal light oriented toward the roadway approach to be illuminated on the traffic signal 106A. The green signal 106A indicates to drivers of the corresponding approach to proceed through the signalized intersection 100. After the green signal light has been illuminated for a period of time, the traffic signal 106A changes to a third signal indication in which the traffic signal controller causes a yellow signal light oriented toward the roadway approach to be illuminated on the traffic signal 106A. The yellow light indicates to drivers of the corresponding approach that the drivers should prepare to stop behind the stop line. Finally, after the yellow signal light has been illuminated for a period of time, the traffic signal controller returns the traffic signal 106A to the red indication to begin a new cycle corresponding to the particular approach. Other signal indications may also be present in a cycle for one or more of the roadway approaches, such as indications for turning lanes, arrows, blinking lights, etc.

Figure 1B:
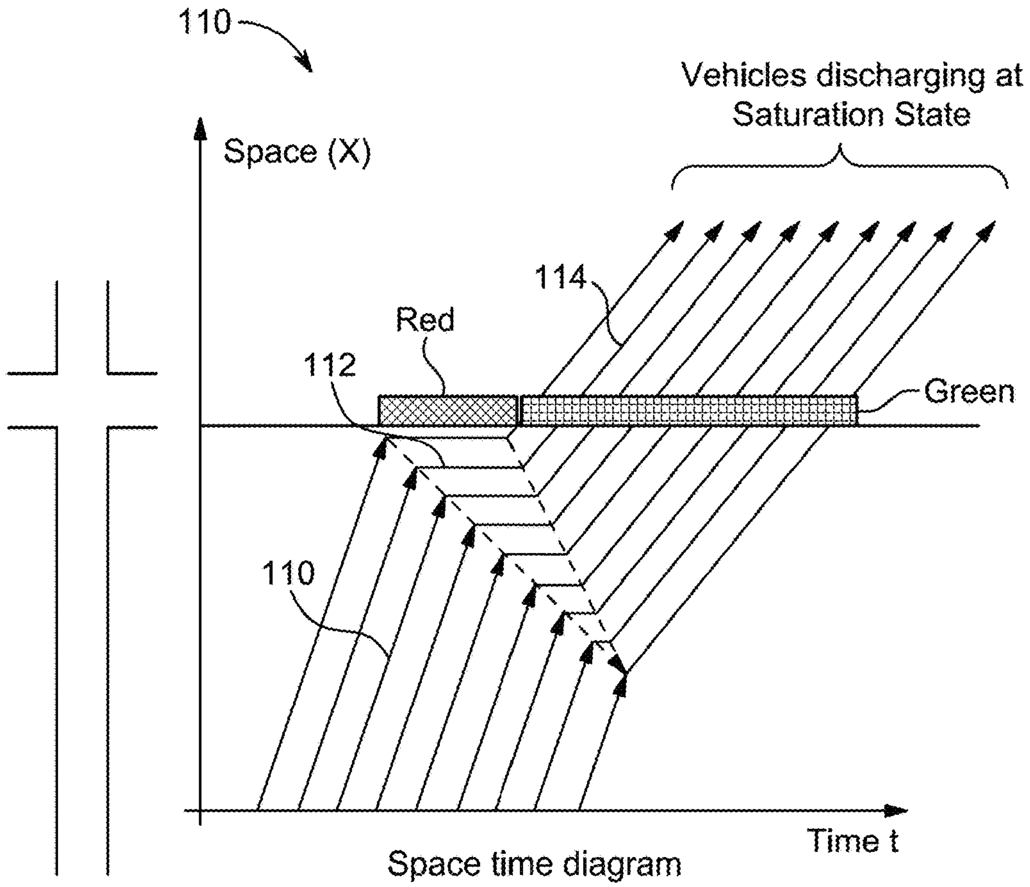
FIG. 1B is a space-time diagram illustrating vehicle trajectories at the traffic signal, according to aspects of the present disclosure.
Figure 1C:
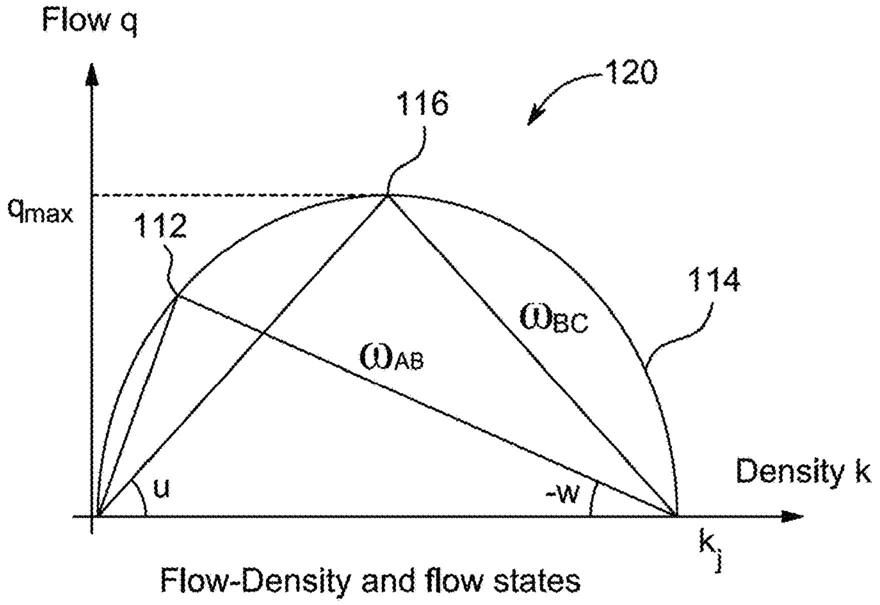
FIG. 1C is a flow-density diagram depicting different states of vehicles movement, according to aspects of the present disclosure.

The traffic signal cycle can begin at any time during any of the signal indications, as long as each cycle begins at the same relative time. For example, a traffic signal cycle can begin each time the traffic signal turns green, yellow or red if desired. As described above, the traffic signal controller controls traffic signals so that the traffic signals cycle through the various phases at different times to allow traffic to safely flow through signalized intersection 100. Timing of the phases with respect to each other, as well as the duration of time each traffic signal light is illuminated in each phase can be varied depending on the relative traffic demand at each approach to aid in traffic flow. In addition, the timing of the phases at successive intersections along a roadway can be coordinated and varied to aid in efficient traffic flow along a traffic corridor. Although traffic signals 106A-D combine to include signal indications oriented to each approach to the intersection, for purposes of simplicity the discussion of signal indications herein will only be directed to the signal indications oriented toward a single movement at the signalized intersection 100 that we are interested in assessing its level of service (e.g., a northbound through movement having the traffic signal 106A at the signalized intersection 100) unless specifically noted otherwise. From an observer's perspective, at the signalized intersection 100 when a red light is illuminated at the traffic signal 106A, a state of vehicle flow changes from free flow condition to a complete stop in a queue. When the signal turns green, the stopped vehicles begin to discharge from the queue and move closely one after another in a highly dense traffic flow. The movement usually, this state of flow is known as "saturation discharge" rate. FIG. 1B depicts a space-time diagram 110 illustrating vehicle trajectories at the traffic signal 106A, according to aspects of the present disclosure. FIG. 1B illustrates three states: a state A 112, a state B 114, and a state C 116. The state A 112 illustrates vehicles arriving at the signalized intersection 100 at the traffic signal 106A. The state B 114 illustrates the vehicles stopping in a queue in response to the red light at the traffic signal 106A. The state C 116 illustrates a saturation discharge state, where the vehicles start moving in response to the green light. Corresponding to FIG. 1B, FIG. 1C illustrates a flow density curve 120, states of the vehicle flow generated at the traffic signal 106A. The flow-density 120 depicts the state A 112, the state B 114, and the state C 116, where $k_j$ is a jam density, $\omega_{AB}$ and $\omega_{BC}$ are traffic shock wave speeds which represent a change of state in the vehicle flow. In one or more embodiments, a traffic delay may be defined as a total divergence in time for a vehicle trajectory due to a traffic control device such as a traffic light.

Figure 2:
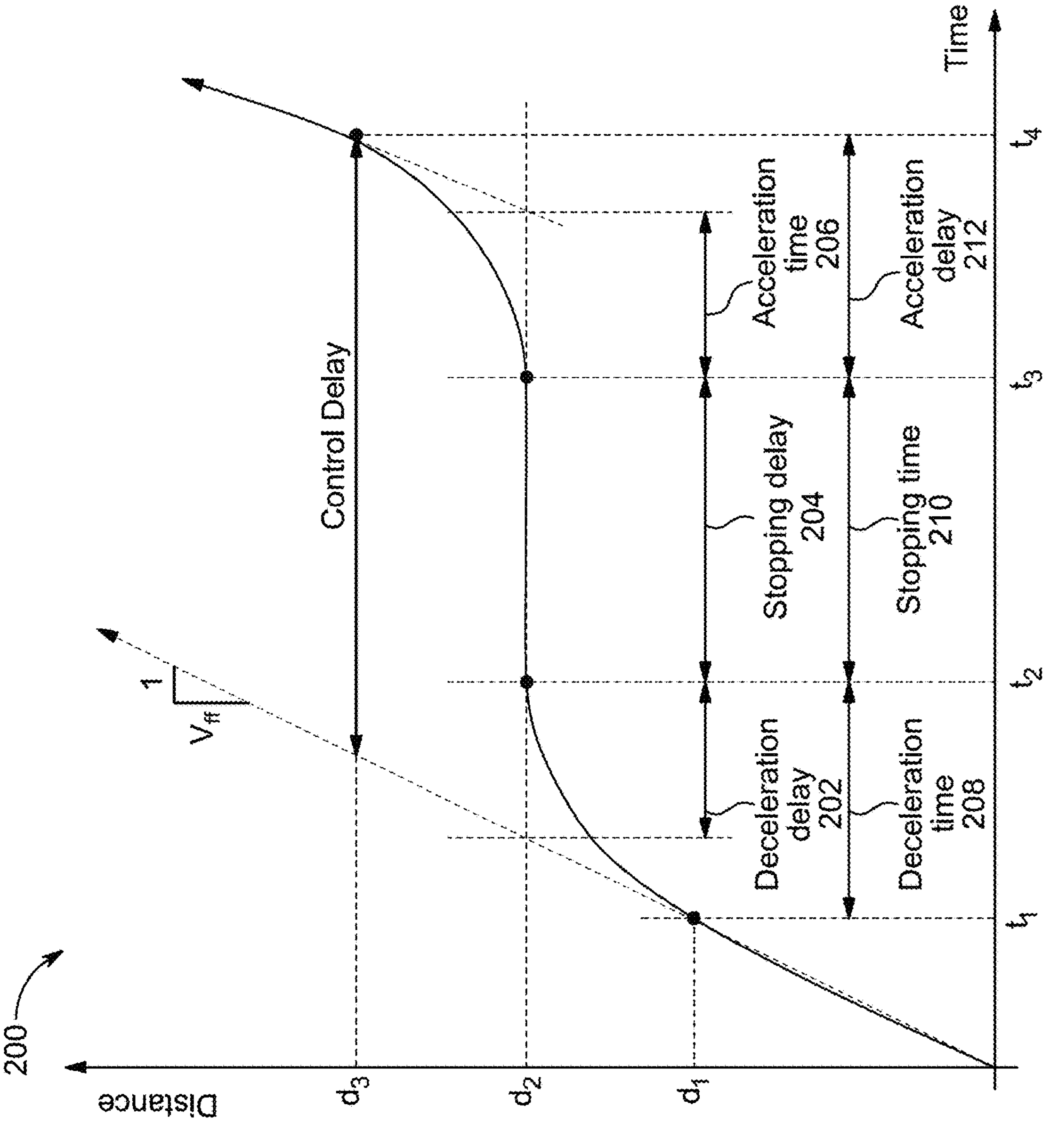
FIG. 2 is a space-time diagram having components of control delay, according to aspects of the present disclosure.

FIG. 2 is a space-time diagram 200 having components of control delay, according to aspects of the present disclosure. The components of control delay may include three elements: a deceleration delay 202, a stop delay 204, and an acceleration delay 206. In an example, an average control delay per vehicle in a traffic signal is a performance measurement used by the Highway Capacity Manual (HCM) (TRB2010) to determine a LOS for the traffic light 106A. FIG. 2 is another representation of FIG. 1B illustrating phases of vehicular movement that is marked by a vehicle trajectory on the space-time diagram 200. To elaborate, a vehicle may be moving at a given speed given a road free of any obstacles. A vehicle driver may notice the signalized intersection 100 at a foreseeable distance. The vehicle driver may start to apply brakes at '$t_1$' at a distance '$d_1$' to decelerate and to completely stop the vehicle at '$t_2$' in response to a red signal at the traffic signal 106A. The time between $t_1$ and $t_2$ is a deceleration time 208. A phase when the vehicle starts to rapidly decline its speed due to deceleration till it reaches a distance '$d_2$' is a deceleration delay 202. Further, a time period between $t_2$ and $t_3$ is a period where the vehicle stops at $d_2$, is called as a stopped delay 204 or stopped time 208. Further, a time period between $t_3$ and '$t_4$' is a period where the vehicle starts to move from $d_2$, to reach '$d_3$' is called as an acceleration time 212. A point from which the vehicle starts increasing pace after some movement, at an accelerating pace $V_{ff}$ from a slow movement is an acceleration delay 206. A time period that elapsed for the vehicle to reach distance $d_3$ without the traffic signal in comparison with the time where the vehicle actually reaches the distance $d_3$ due to traffic signal is called a control delay.

Figure 3:
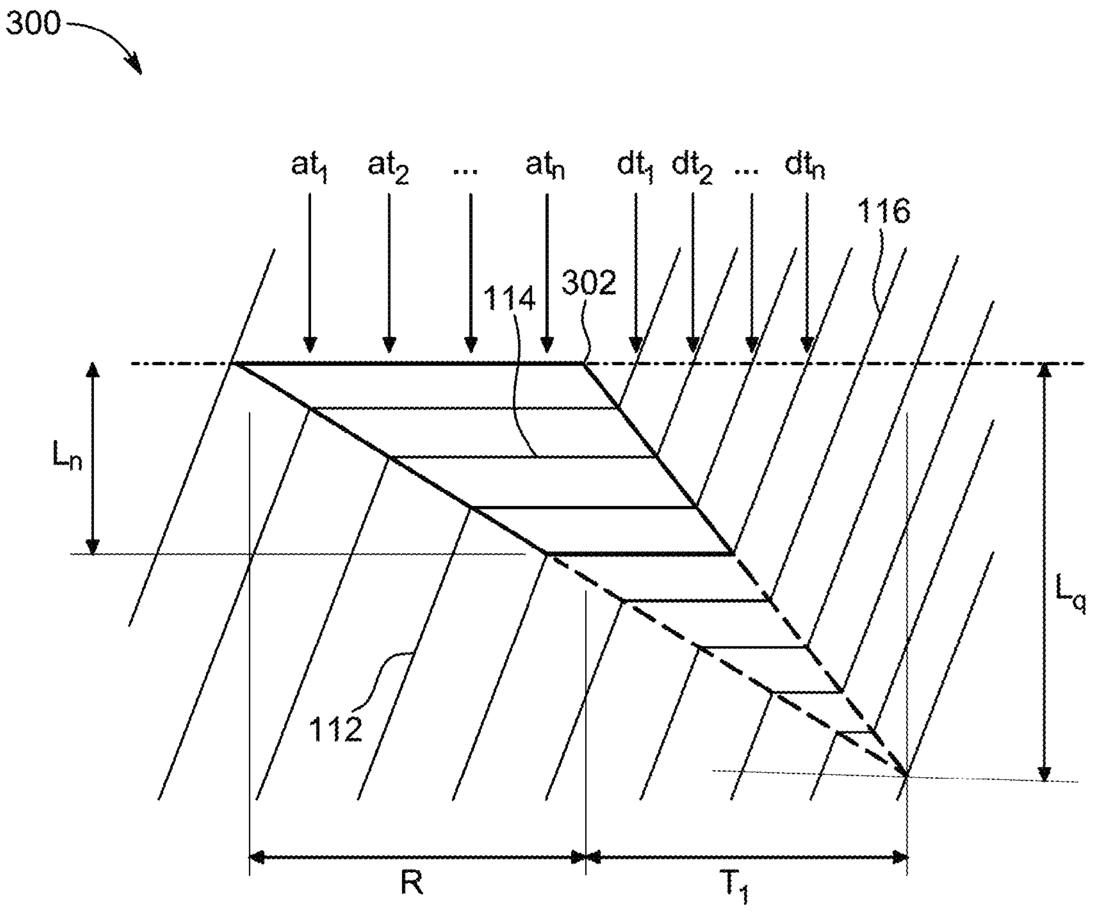
FIG. 3 is a graph of arrival and departure times of vehicles, according to aspects of the present disclosure.

FIG. 3 illustrates a graph 300 of arrival and departure times, according to one embodiment. The graph 300 illustrates recorded arrival times for first 'n' vehicles which stop after the signal turns red, forming a length ($L_n$). The graph 300 also illustrates recorded departure times for the first n vehicles when the first n vehicles start passing the traffic stop line or departure headway after the traffic signal 106A turns green. Arrival of each vehicle and departure of each vehicle is sampled for a given queue. For example, arrival time of a vehicle 1 is sampled at $at_1$ and departure time of the vehicle 1 is sampled at $dt_1$. In an example, the arrival times and the departure times are recorded using a LOS logging device described further in the disclosure. A total stop delay for the vehicles arriving in a cycle in an area under a triangle 302 is given by:

$$\text{Stop Delay per Cycle (sec. } veh.) = \frac{1}{2} * R * L_q, \tag{1}$$

where R=Red time interval (in seconds), and $L_q$=Queue length (in vehicles).

The disclosure takes into consideration the randomness of traffic flow in terms of arrival rates and departure rates. Thus, the method, system and apparatus is configured to enable collection of vehicle arrival times and departure times for more than one cycle up to a point where collected data (including arrival times and the departure times) reaches an acceptable degree of confidence. The point may be referred to as a data collection stopping criteria. In some implementations, the data collection stopping criteria is when the means of the arrival headway for arrival and departure reach a predetermined degree of confidence. The mean may be calculated as the data is collected. In some example implementations, the data collection stopping criteria is when the number of vehicles arriving at the traffic light reaches a predetermined queue number or the error during arrival and the error during departure are below a preset acceptable error limit. In some implementations, the data collection stopping criterion is when a mean upper-bound error at 95% degree of confidence reaches the acceptable limit for both arrival and departure headways.

Data Sampling

Measurements may be subject to errors due to human/machine measurement error and sampling error. The human/machine measurement error may be due to a human response time in obtaining service logging. For example, there may be errors due to human operation of the LOS service logging device such as latency in pressing data entry buttons, and service logging response times. The sampling error is dependent on the number of observations n, variance of the observations ($\sigma^2$), a degree of confidence, and the allowable error. The human/machine error ($err_m$) may be determined for each apparatus's user. Allowable error in arrival and departure headway observations ($err_h$) is kept greater than or equal to the human/machine error ($err_m$). Also, the sampling error is kept lesser than an allowable error in headway observations ($err_h$). Thus, the allowable sampling error is a function of the measurement error $err_h = \alpha \cdot err_m$, where ($\alpha$) is a multiplier to be set by an operator/user.

As a standard deviation in headways (for both arrivals and departures) varies by time of day and site's spatial location, determining a sample size ahead of time may be difficult. Hence, a continuous sampling method may be deployed where the sample mean may be calculated after each reading as follows:

$$\bar{X}_n = \frac{\bar{X}_{n-1} * (n-1) + X_n}{n}, \tag{2}$$

where $\bar{X}_n$ is a sample mean after reading number (n), $\bar{X}_{n-1}$ is a sample mean at the previous reading (n−1), and $X_n$ is a reading number (n). The standard deviation of the sample after reading (n) may be provided by:

$$\sigma_n = \sqrt[2]{\frac{\left(\sum_{i=1}^{n} X_i^2\right) - n * \bar{X}_n^2}{(n-1)}}, \tag{3}$$

where $\sigma_n$ is sample standard deviation after reading (n) and $\bar{X}_n$ is a sample mean after reading (n). Thus, the sample error, i.e., an upper bound error in the true mean (EBM), may be provided by:

$$err_n = z * \sqrt[2]{\frac{\left(\sum_{i=1}^{n} X_i^2\right) - n * \bar{X}_n^2}{n(n-1)}}; \tag{4}$$

where, z is a multiplier that depends on the sought degree of confidence (z=1.96@95% degree of confidence). The sampling stopping criteria may be provided by:

$$err_n \le err_h. \tag{5}$$

After reaching the sampling stopping criterion, an average delay per vehicle may be calculated.

Average Delay Calculations:

A total length of the queue is a function of an arrival rate (the state A 112), saturation flow rate (the state C 116), and jam density (the state B 114) may be written as follows:

$$L_q = \frac{R * \omega_{AB} * \omega_{BC}}{3600\,(\omega_{BC} - \omega_{AB})} * k_b, \tag{6}$$

where $\omega_{AB}$ is a shock wave speed between the state A 112 and the state B 114, (in km/hr) with:

$$\omega_{AB} = \frac{Q_a}{k_a - k_b}, \tag{7}$$

where $Q_a$ is an arrival rate of vehicles, $$Q_a = \frac{3600}{\overline{at}}$$

(vehicle/hour), $k_a$ is a traffic density of arriving vehicles (vehicle/km/lane), which is further given by:

$$k_a = \frac{k_b}{2}\left[1 - \sqrt{1 - \frac{4Q_a}{k_b * V_f}}\right], \quad (8)$$

where $k_b$ is the traffic density (vehicle/km/lane) at the state B 114 and equals the jam density, "$k_{jam}$", $V_f$ is a free-flow speed in (km/hour), in urban areas it will be equal to the posted speed limit, $\omega_{BC}$ is a shock wave speed between the state B 114 and the state C 116, given by:

$$\omega_{BC} = \frac{Q_c}{k_b - k_c}. \quad (9)$$

Since a linear speed-density relationship is considered, $\omega_{BC}$ is given by:

$$\omega_{BC} = \frac{2Q_c}{k_{jam}}, \quad (10)$$

where $Q_c$ is flow rate at the saturation state C 116 in vehicle/hour, $$Q_c = \frac{3600}{\overline{dt}}; \quad (11)$$

$k_{jam}$ is a jam density (vehicle/km/lane), $$k_{jam} = \frac{\overline{n}}{L_n},$$

where, $\overline{n}$ is the average number of vehicles occupy the sampling length ($L_n$) over (N) cycles. Hence, the average delay per vehicle is obtained by dividing the total stop delay obtained in the equation (1) by the number of vehicles arriving in one cycle. Substituting for $L_q$ in the equation (1) will provide the estimated total stop delay in the queue, $qD_c$ per cycle, $$qD_C = \frac{0.5 * R^2 * \omega_{AB} * \omega_{BC}}{3600 * (\omega_{BC} - \omega_{AB})} * k_{jam} \text{ hour. vehicle.} \quad (12)$$

In order to consider the deceleration delay for the stopped vehicles while approaching the signalized intersection 100, $$\frac{V_a}{2d}$$

is added, where d is a safe deceleration rate, which is usually around 2.5 m/sec$^2$, $V_a$ is an average speed of arriving vehicles, which can be estimated by dividing the arrival flow rate by the density of the flow at the state A 112, as the $$\frac{Q_a}{K_a}.$$

As a result, the estimated total control delay ($tD_c$) per cycle would be:

$$tD_C = \frac{0.5 * R^2 * \omega_{AB} * \omega_{BC}}{3600 * (\omega_{BC} - \omega_{AB})} * k_{jam} + \frac{0.5 * Q_a}{d * K_a} \text{ hour. vehicle.} \quad (13)$$

Given $tD_c$ in hours. vehicle, in order to obtain the average total control delay per vehicle, $tD_c$ is divided by the number of vehicles arriving in one cycle which is $Q_a$*C/3600. As a result, the average total control delay per vehicle is provided by:

$$\overline{tD} = \frac{0.5 * R^2 * \omega_{AB} * \omega_{BC}}{C * Q_a(\omega_{BC} - \omega_{AB})} * k_{jam} + \frac{1800}{d * K_a * C} \text{ hour. per vehicle,} \quad (14)$$

where C–Cycle length in (Sec.), and $K_a$ is the traffic density of arriving vehicles.

Figure 4:
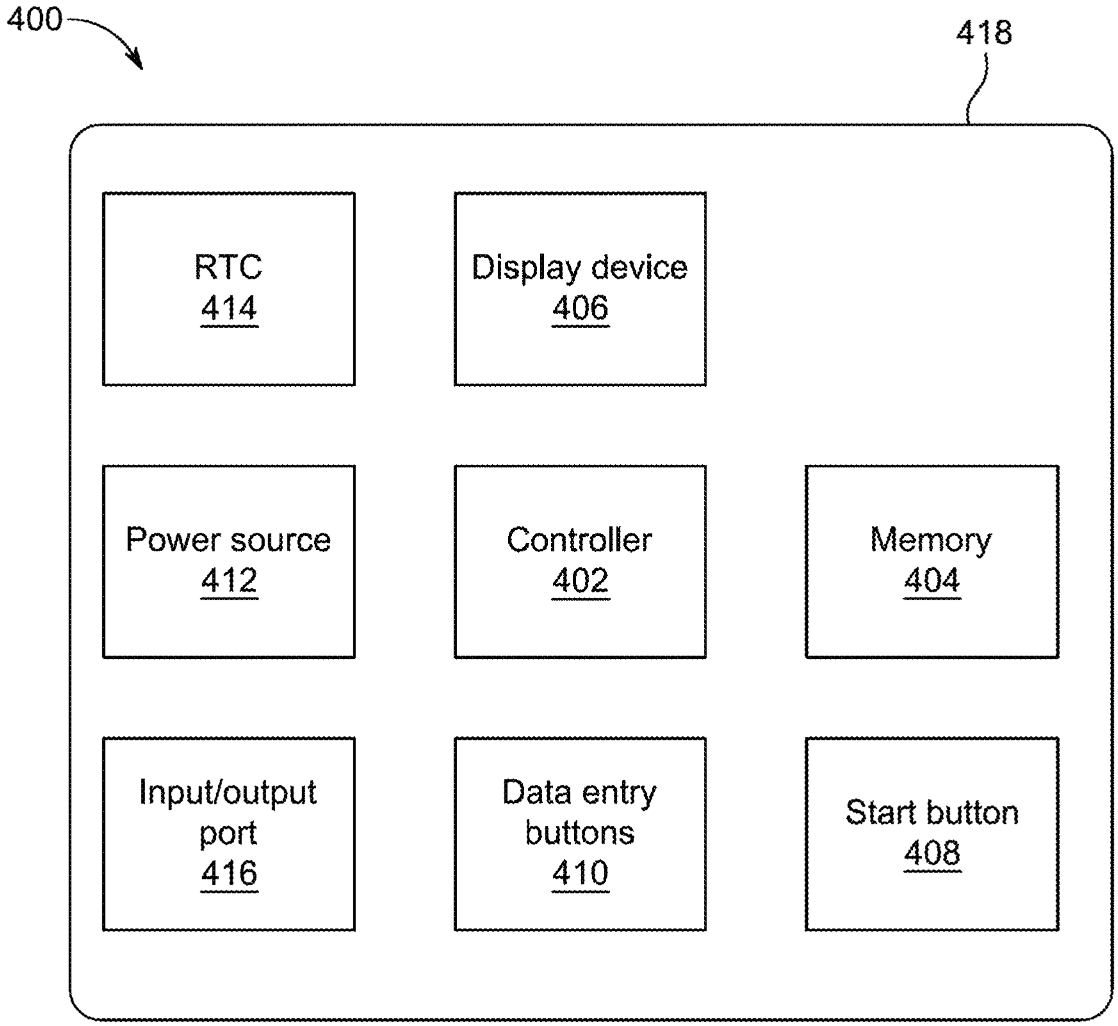
FIG. 4 is a schematic view of a level of service logging device, according to aspects of the present disclosure.

FIG. 4 is a schematic view of a LOS logging device 400 for estimating an average delay per vehicle, according to aspects of the present disclosure. The LOS logging apparatus 400 includes a controller 402, a memory 404, a display device 406, a start button 408, data entry button(s) 410, a power source 412, a real-time clock 414, and an input/output port 416. Components 402-416 are enclosed in an encasement 418. The enclosure may be a solid and sturdy enclosure made of metal or plastic ergonomically designed for an operator to use if for a long time. The LOS logging device 400 is designed as a portable and handheld device for the operator to use. The controller 402 may utilize a special purpose or general-purpose controller or a computer including computer hardware having an inbuilt system memory. The memory 404 may include a computer-readable media for carrying or storing a control program and/or data structures. Such computer-readable media can be any available media that can be accessed by a general purpose or special purpose computer system. The computer-readable media may include at least different kinds of computer-readable media: computer storage media and transmission media. The memory 404 may also include random access memory (RAM), read only memory (ROM), electrically erasable programmable read-only memory (EEPROM), compact disc-read only memory (CD-ROM), solid state drives (SSDs) (e.g., based on RAM), flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer such as the controller 402. The display device 406 may be a liquid crystal display (LCD), a light-emitting diode (LED), or any such display device configured to display input, output, and any state information. The start button 408 is for the operator to start the LOS logging device 400. The data entry button(s) 410 allows the operator to input such as start a level of service measurement and open a data storage file in the memory 404, input indicating when vehicle(s) stop after the traffic signal turns red, an input when the vehicle(s) departs from the traffic, and such data described in the disclosure.

The power source 412 may provide required power for the LOS logging device 400. The power source 412 may include a wired power supply, a battery supply, a solar powered power supply and such power supplies. The real time clock 414 provides clocking requirements for the LOS logging device 400. The input/output port 416 may be a data communication port such as a universal serial bus (USB) port or any such port to receive input such as software, updates, etc., from, and to output the determined average delay per vehicle, and the data entries from stored file to external devices such as such as computer, mobile and such devices. The memory 404 may store the control program for the LOS logging device for estimating an average delay per vehicle at a signalized intersection 100 with the traffic signal 106A. The control program when executed by the controller 402 performs a methodology for data and LOS estimation by receiving inputs as described below. A sample queue length ($L_n$) is marked which the operator can see, where the queue length is expected to exceed the queue in each cycle, then the following steps are performed using the LOS logging device 400. In steps requiring operator input, the operator is enabled to provide the input through the data entry buttons 410, and control the operation of the LOS logging device using various buttons.

| | |
|---|---|
| Step 1 | Start LOS Study Push Button (on the beginning of a Red time interval) |
| Step 2 | Open data storage file, and wait for the traffic signal to turn Red |
| Step 3 | Press input (A) using data entry button when the first vehicle stops ($at_0$) |
| Step 4 | Press input (B) using data entry button upon arrival of vehicle(i), and record headway (i), $h_{ai} = at_i\text{-}at_{i-1}$ |
| Step 5 | Update arrival headway sample mean and standard deviation according to the equation 2 and the equation 3, respectively |
| Step 6 | Calculate error for the mean arrival headway |
| Step 7 | Check: (Visual check by observer)<br>If (Queue Length = $L_n$)<br>Then<br>Stop sampling arrival headways, and wait for the traffic signal to turn Green<br>Else<br>Go to Step 4 |
| Step 8 | Press input (C) using data entry button after the first vehicle passes the stop-line ($dt_0$) |
| Step 9 | Press input (D) using data entry button upon arrival of vehicle(i), and record headway (i), $h_{di} = at_i\text{-}at_{i-1}$ |
| Step 10 | Update departure headway sample mean and standard deviation according to the equation 2 and equation 3, respectively |
| Step 11 | Calculate error for the mean arrival headway |
| Step 12 | Check: Carried out by LOS logging device<br>If (i < n-1) then Go to Step 9<br>If ($err_a$ and $err_d$ )> $err_{limit}$ then Go to Step 2 |
| Step 13 | Calculate Avg Delay Per Vehicle and LOS,<br>Issue Report,<br>Close File<br>Stop |

The controller 402 may perform a dynamic sampling method in which the error during arrival or the error during departure is calculated after each input from the at least one data entry button(s) 410. Also, the controller 402 may log data entries for each input from the data entry button(s) 410 to a file in the memory 404. The LOS logging device 400 may process the inputs to generate the determined average delay per vehicle.

Figure 5:
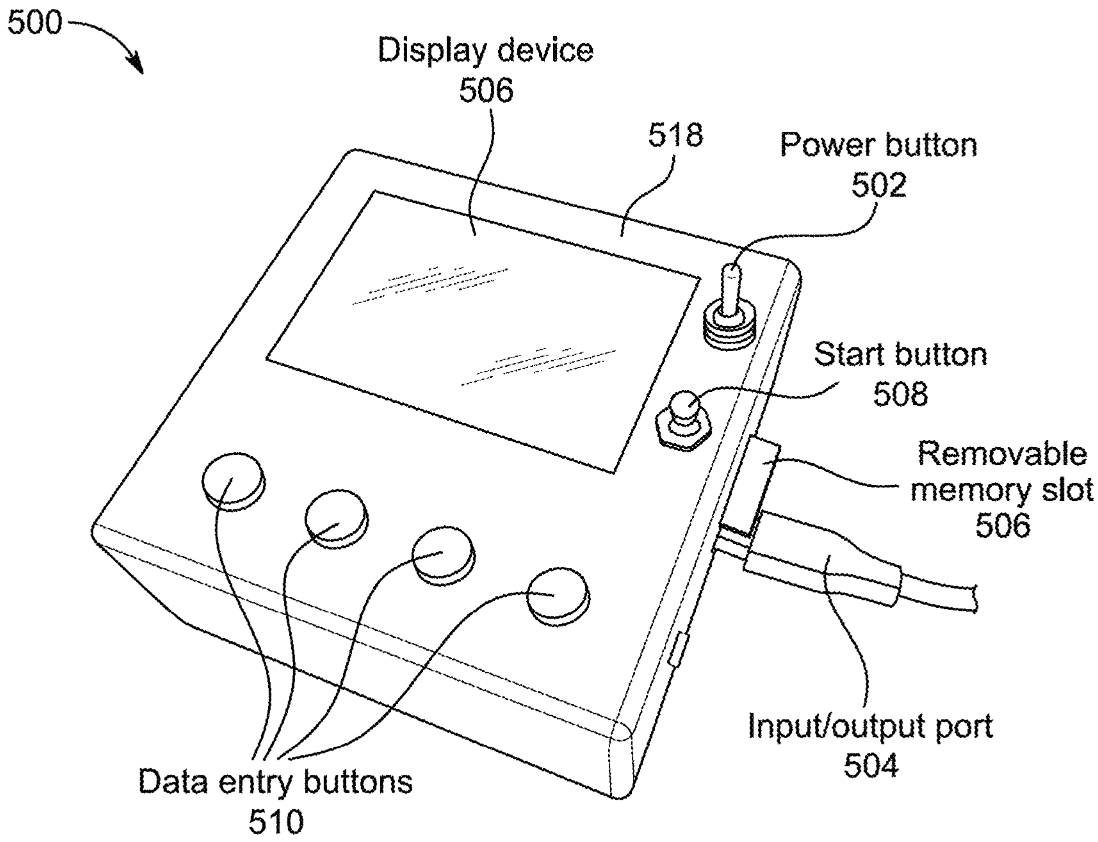
FIG. 5 illustrates an exemplary level of service logging device, according to aspects of the present disclosure.

An example design implementing the method, system, and device of the disclosure is illustrated in FIG. 5. FIG. 5 illustrates a power button 502, an input/output port 504, a removable memory slot 506, a display device 508 in a form of a LCD, a start button 510, data entry buttons 512 enclosed in an encasement 518. As illustrated, the LOS logging device 500 is a portable handheld light weight device which can be easily carried by the operator. Furthermore, a single LOS logging device 500 is sufficient for the operator to estimate an average delay per vehicle. There is no requirement of having multiple operators as in known art. The operator can switch on the LOS logging device using the power button 502. The operator may start sample measurement using the start button 508. Using various data entry buttons 512, the operator may sample measurements such as sampling vehicle arrival rates and sampling vehicle departure rates at the signalized intersection 100. The measurements may be displayed on the display device 508. The measurement may be saved on a file in an internal memory device (not shown) or the removable memory device stored in the removable memory slot 506.

Figure 6:
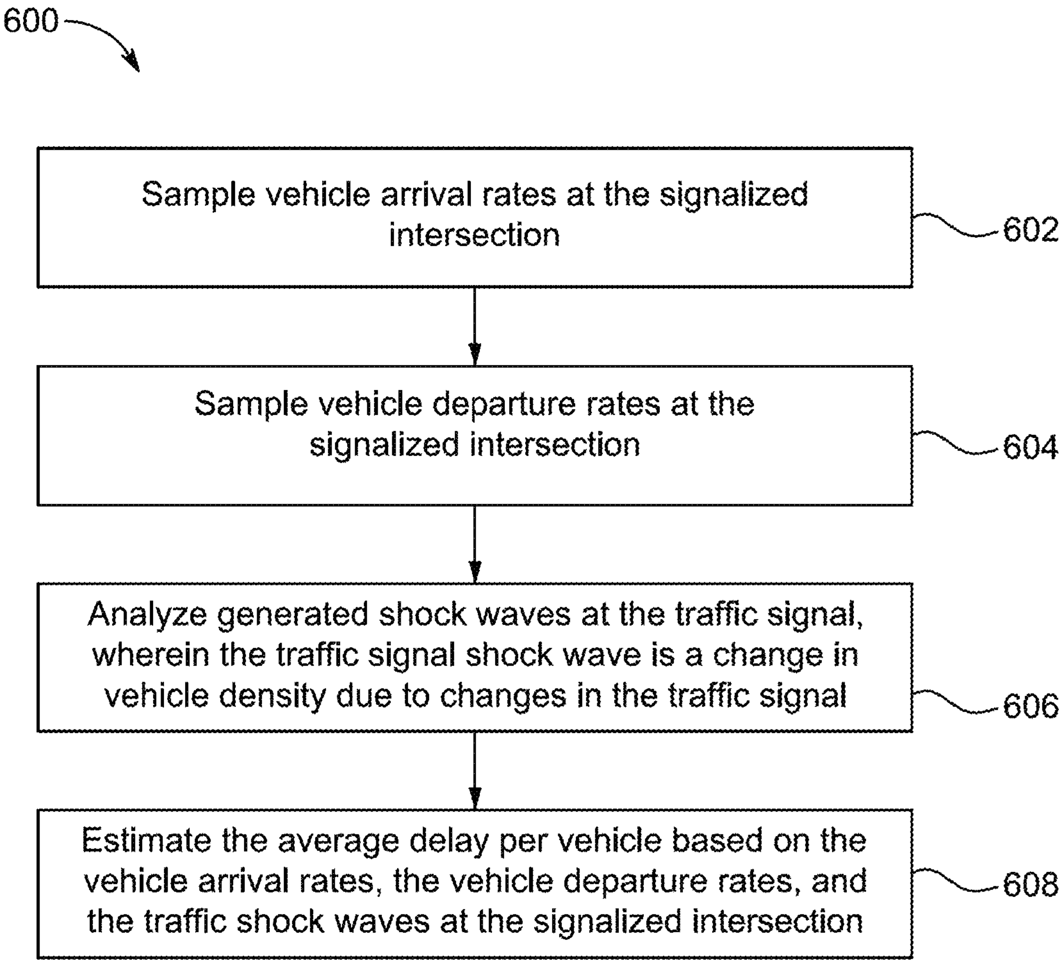
FIG. 6 is a flowchart for a method of calculating average delay per vehicle, according to aspects of the present disclosure.

FIG. 6 illustrates a method for estimating an average delay per vehicle at a signalized intersection 100 with the traffic signal 106A, according to aspects of the present disclosure. In step 602, vehicle arrival rates $Q_a$ is sampled at the signalized intersection 100. In step 604, vehicle departure rates $Q_c$ is sampled at the signalized intersection 100. In step 606, generated shock wave speeds $\omega_{AB}$ and $\omega_{BC}$, may be analyzed at the traffic signal 106A. The traffic signal shock wave is a change in vehicle density due to changes in the traffic signal. The generated traffic shock waves may be analyzed by determining a shock wave speed $\omega_{AB}$ between an arrival flow state (the state A 112) and a stopped flow state (the state B 114) and determining the shock wave speed $\omega_{BC}$ between a stopped flow state (the state B 114) and a departure flow state (the state C 116). In step 608, an average delay per vehicle may be estimated based on the vehicle arrival rates $Q_a$, the vehicle departure rates $Q_b$, and the traffic shock wave speeds $\omega_{AB}$ and $\omega_{BC}$ at the signalized intersection 100. In one example implementation, the sampling, analyzing, and estimating steps are performed by the single LOS logging device (for example, LOS logging device 400 or LOS logging device 500). In one example, a dynamic sampling method is performed in which a sampling error is calculated after each reading. After reaching a sampling stopping criterion based on the sampling error of the dynamic sampling method, the estimating the average delay per vehicle is performed. The sampling error is kept less than an allowable error in headway observations. The allowable error is a function of a human-machine error for a level of service logging device. In an additional step, a stop delay of the stopped flow state is determined based on a red traffic signal time interval and a queue length in vehicles.

Figure 7A:
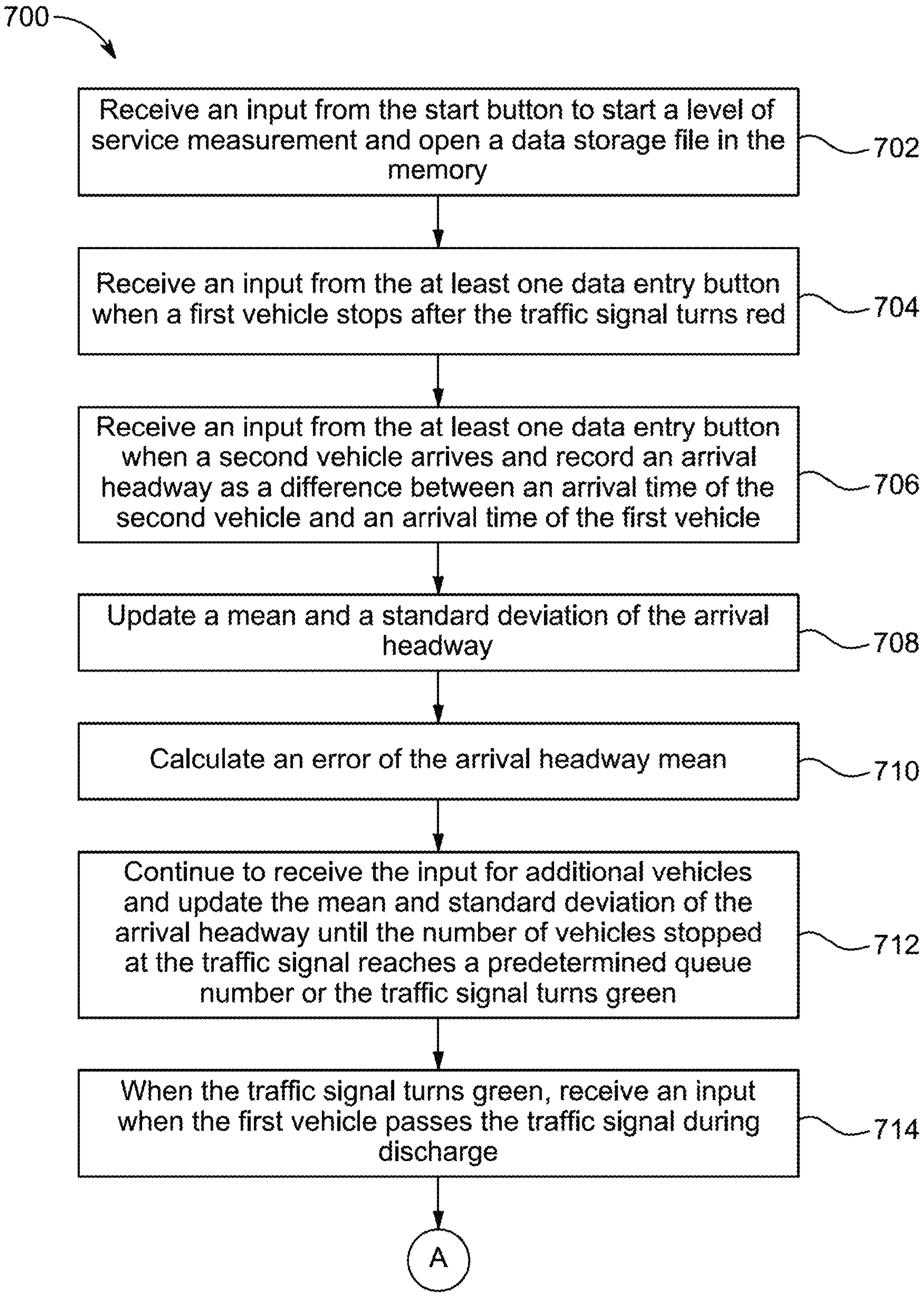
FIGS. 7A, 7B is a flowchart of a method of level of service estimation, according to aspects of the present disclosure.
Figure 7B:
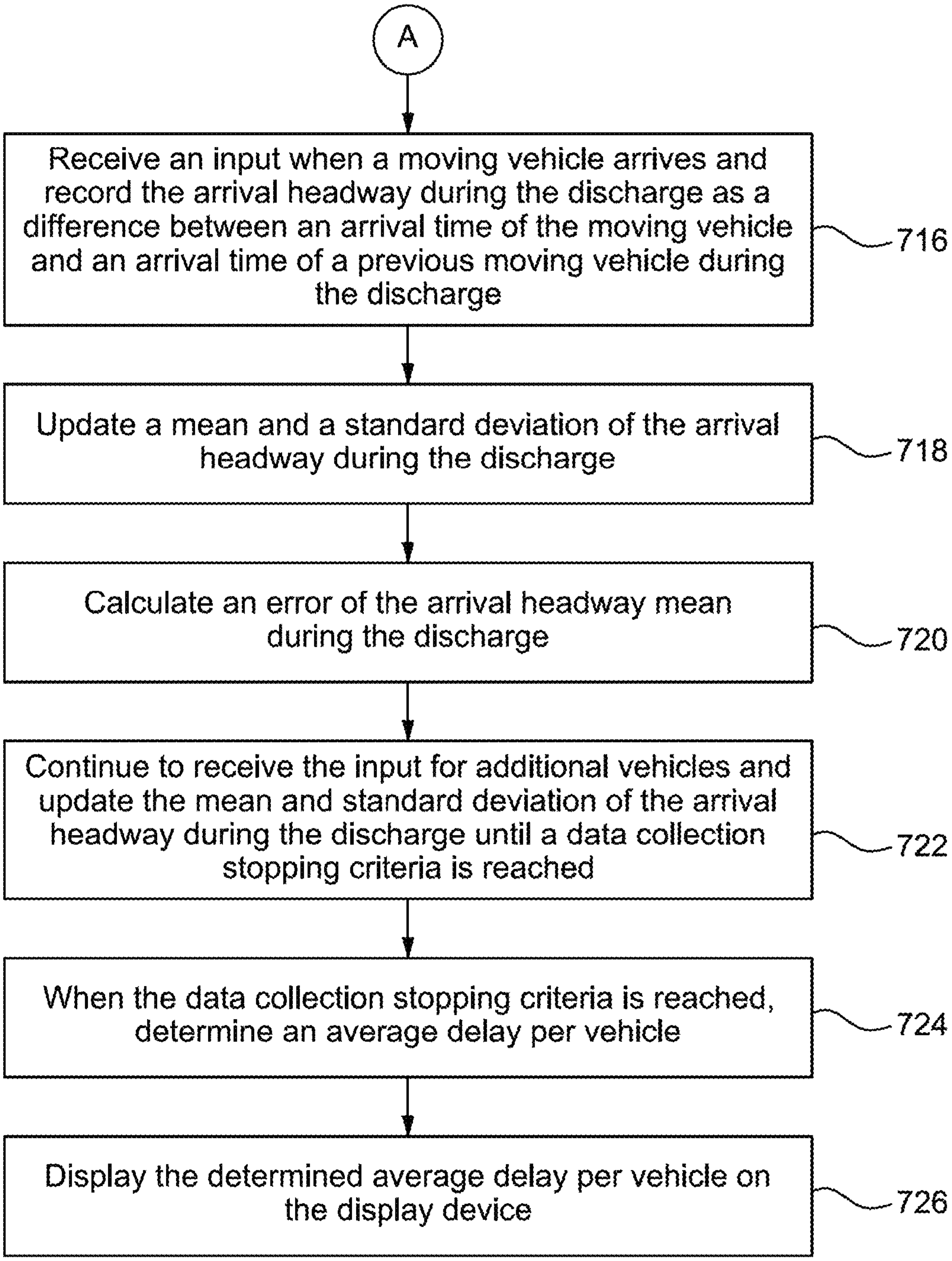

FIGS. 7A, 7B illustrate a method for estimating an average delay per vehicle at the signalized intersection 100 using the LOS logging device 400 or 500 with the traffic signal 106A, according to aspects of the present disclosure.

In step 702, receive an input from a start button (e.g., the start button 408 or the start button 508) to start a level of service measurement and open a data storage file in the memory 404. In step 704, receive an input from the at least one data entry button 410 or 510 when a first vehicle stops after the traffic signal 106A turns red. In step 706, receive an input from the at least one data entry button 410 or 510 when a second vehicle arrives and record an arrival headway as a difference between an arrival time of the second vehicle and an arrival time of the first vehicle. In step 708, update a mean ($\overline{X}_n$) and a standard deviation ($\sigma_n$) of the arrival headway by processing data recorded for the vehicles. In step 710, calculate an error ($err_h$) of the arrival headway mean. In step 712, continue to receive the input for additional vehicles and update the mean ($\overline{X}_n$) and standard deviation ($\sigma_n$) of the arrival headway until the number of vehicles stopped at the traffic signal reaches a predetermined queue number or the traffic signal turns green. In step 714, when the traffic signal turns green, receive an input from the at least one data entry button 410 or 510 when the first vehicle passes the traffic signal during departure. In step 716, receive an input when a moving vehicle arrives and record the arrival headway during the departure as a difference between an arrival time of the moving vehicle and an arrival time of a previous moving vehicle during the departure. In step 718, update a mean ($\overline{X}_n$) and a standard deviation ($\sigma_n$) of the arrival headway during the departure. In step 720, calculate an error of the arrival headway mean ($err_n$) during the departure. In step 722, continue to receive the input for additional vehicles and update the mean ($\overline{X}_n$) and standard deviation ($\sigma_n$) of the arrival headway during the departure until a data collection stopping criteria is reached. In an example, the data collection stopping criteria is when the number of vehicles arriving at the traffic light reaches a predetermined queue number or the error during arrival and the error during departure are below the error limit. The predetermined queue number is based on a vehicle arrival rate $Q_a$, the saturation flow rate $Q_b$, and a jam density $k_j$. In another example, the data collection stopping criteria is when the means of the arrival and departure headways reach a predetermined degree of confidence (for example, 95%). In step 724, when the data collection stopping criteria is reached, determine an average delay per vehicle ($\overline{tD}$). In step 726, display the determined average delay per vehicle on the display device 406 or 506.

ADVANTAGES

The methods, system and device of the disclosure enables a single user to perform measurements. A single LOS logging device 400 or 500 of disclosure operated by a single user/operator is adequate for performing measurement and to estimate the average delay per vehicle which is an indicator for the LOS. In comparison with the known art, the methods, system and device of the disclosure does not require that the intersection should be undersaturated. As a result, the average delay per vehicle estimates are far more accurate in comparison with known art. Also, with analysis of the generated traffic shock waves at the traffic signal, the average delay per vehicle estimation is reliable.

Numerous modifications and variations of the present invention are possible in light of the above teachings. It is therefore to be understood that within the scope of the appended claims, the invention may be practiced otherwise than as specifically described herein.

The invention claimed is:

1. A method for assessing a signalized intersection for shock wave patterns, comprising:

sampling, by a controller, vehicle arrival rates at the signalized intersection, wherein the signalized intersection comprises at least one traffic signal positioned at the signalized intersection, and the signalized intersection includes at least two roadways and at least 3 directions of traffic;

sampling, by the controller, vehicle departure rates at the signalized intersection;

analyzing, by the controller, traffic shock waves that occur at the signalized intersection, wherein the traffic shock waves are a change in vehicle density due to changes in the traffic signal selected from the group consisting of a backward queue forming shock wave and a backward recovery shock wave;

estimating, by the controller, an average delay per vehicle based on the vehicle arrival rates, the vehicle departure rates, and the traffic shock waves at the signalized intersection;

wherein the estimating comprises determining the average delay per vehicle in accordance with $$\overline{tD} = \frac{0.5 * R^2 * \omega_{AB} * \omega_{BC}}{C * Q_a(\omega_{BC} - \omega_{AB})} * k_{jam} + \frac{1800}{d * K_a * C}$$

wherein,

C is traffic signal cycle length,

R is Red light time interval, $\omega_{AB}$ is shock wave speed between flow states, arrival state A and jam state B, $\omega_{BC}$ is the shock wave speed between flow states, jam state B and saturation state C, Qa is arrival rate of vehicles, $k_{jam}$ is traffic density at flow state B, d is safe vehicle deceleration rate, $K_a$ is traffic density of arriving vehicles;

determining, by the controller, a shock wave speed between an arrival flow state and a stopped flow state;

determining, by the controller, a shock wave speed between a stopped flow state and a departure flow state; and determining, by the controller, a stop delay of the stopped flow state.

2. The method of claim 1, wherein the stop delay of the stopped flow state is based on a red traffic signal time interval and a queue length.

3. The method of claim 1, wherein the sampling, analyzing and estimating steps are performed by the controller of a single level of service logging device.

4. The method of claim 1, further comprising:

performing, by the controller, a dynamic sampling method in which a sampling error is calculated after each reading, wherein the sampling error is dependent on a number of observations, variance of the observations, and a degree of confidence; and after reaching a sampling stopping criterion based on the sampling error of the dynamic sampling method, performing, by the controller, the estimating the average delay per vehicle.

5. The method of claim 4, wherein the sampling error is less than an allowable error in arrival and departure headway observations, wherein the allowable error is a function of a human-machine error for a level of service logging device.

6. A signalized intersection level of service data logging device, comprising:

wherein the signalized intersection level of service data logging device is positioned at a signalized intersection comprising at least one traffic signal, and at least two roadways and at least three directions of traffic;

a microcontroller;
a memory;
a display device;
a start button; and
at least one data entry button,
the microcontroller configured to
receive an input from the start button to start a level of service measurement and open a data storage file in the memory,
receive an input from the at least one data entry button when a first vehicle stops after the traffic signal turns red,
receive an input from the at least one data entry button when a second vehicle arrives and record an arrival headway as a difference between an arrival time of the second vehicle and an arrival time of the first vehicle,
continuously update a mean and a standard deviation of the arrival headway,
calculate a standard error of the arrival headway mean,
continue to receive the input for additional vehicles' arrival headways and update the mean and standard deviation of the arrival headway until a number of vehicles stopped at the signalized intersection reaches a predetermined queue number or the traffic signal turns green,
when the traffic signal turns green the stopped vehicles in the queue start moving, receive an input when the first vehicle discharging from the queue passes the traffic signal,
receive an input when a following vehicle passes the traffic signal and record the discharge headway during the departure as a difference between a passing time of the discharging vehicle and a passing time of a previous discharging vehicle during the departure,
update a mean and a standard deviation of the discharge headway during the departure,
calculate a standard error of the discharge headway mean during the departure,
continue to receive the input for additional vehicles and update the mean and standard deviation of the discharge headway during the departure until a data collection stopping criteria is reached,
when the data collection stopping criteria is reached, determine an average delay per vehicle, and
display the determined average delay per vehicle on the display device;
wherein the microcontroller is further configured to determine the average delay per vehicle in accordance with $$\overline{tD} = \frac{0.5 * R^2 * \omega_{AB} * \omega_{BC}}{C * Q_a(\omega_{BC} - \omega_{AB})} * k_{jam} + \frac{1800}{d * K_a * C}$$

wherein:
C is traffic signal cycle length,
R is Red light time interval,
$\omega_{AB}$ is a shock wave speed between flow states, arrival state A and jam state B,
$\omega_{BC}$ is the shock wave speed between flow states, jam state B and saturation state C,
Qa is arrival rate of vehicles,
$k_{jam}$ is traffic density at flow state B,
d is safe vehicle deceleration rate,
$K_a$ is traffic density of arriving vehicles; and
determine a shock wave speed between an arrival flow state and a stopped flow state;
determine a shock wave speed between a stopped flow state and a departure flow state; and
determine a stop delay of the stopped flow state;
wherein the shock wave speeds are based on a backward queue forming shock wave or a backward recovery shock wave.

7. The signalized intersection level of service logging device of claim 6, further comprising:
an output port to output the determined average delay per vehicle.

8. The signalized intersection level of service logging device of claim 6, wherein the data collection stopping criteria is when a number of vehicles arriving at the traffic light reaches a predetermined queue number or the error during arrival and the error during departure are below the error limit.

9. The signalized intersection level of service logging device of claim 8, wherein the predetermined queue number is based on a vehicle arrival rate, a saturation flow rate, and a jam density.

10. The signalized intersection level of service logging device of claim 6, wherein the data collection stopping criteria is when the mean of the arrival headway for arrival and departure reach a predetermined degree of confidence.

11. The signalized intersection level of service logging device of claim 6, wherein the display device is a liquid crystal display device configured to display text.

12. The signalized intersection level of service logging device of claim 6, wherein the logging device is a portable handheld device.

* * * * *